United States Patent
Cao et al.

(10) Patent No.: US 12,554,919 B2
(45) Date of Patent: Feb. 17, 2026

(54) TEXT TYPESETTING

(71) Applicants: BEIJING KINGSOFT OFFICE SOFTWARE, INC., Beijing (CN); ZHUHAI KINGSOFT OFFICE SOFTWARE CO., LTD, Guangdong (CN)

(72) Inventors: Zonghua Cao, Guangdong (CN); Huan Liu, Guangdong (CN); Wenfeng Wang, Guangdong (CN)

(73) Assignees: BEIJING KINGSOFT OFFICE SOFTWARE, INC., Beijing (CN); ZHUHAI KINGSOFT OFFICE SOFTWARE CO., LTD, Guangdong (CN)

( * ) Notice: Subject to any disclaimer, the term of this patent is extended or adjusted under 35 U.S.C. 154(b) by 174 days.

(21) Appl. No.: 18/686,830

(22) PCT Filed: Dec. 28, 2021

(86) PCT No.: PCT/CN2021/142056
§ 371 (c)(1),
(2) Date: Feb. 26, 2024

(87) PCT Pub. No.: WO2023/024377
PCT Pub. Date: Mar. 2, 2023

(65) Prior Publication Data
US 2024/0370637 A1 Nov. 7, 2024

(30) Foreign Application Priority Data
Aug. 26, 2021 (CN) .......... 202110990091.8

(51) Int. Cl.
*G06F 17/00* (2019.01)
*G06F 16/176* (2019.01)
*G06F 40/109* (2020.01)

(52) U.S. Cl.
CPC .......... *G06F 40/109* (2020.01); *G06F 16/176* (2019.01)

(58) Field of Classification Search
CPC .... G06F 40/109; G06F 16/176; G06F 40/103; G06F 40/166; G06F 40/106; Y02D 10/00
See application file for complete search history.

(56) References Cited

U.S. PATENT DOCUMENTS

| | | | |
|---|---|---|---|
| 9,030,677 B2 * | 5/2015 | Korndoerfer | G06K 15/1823 358/1.9 |
| 9,229,913 B2 | 1/2016 | Oh et al. | |

(Continued)

FOREIGN PATENT DOCUMENTS

| | | |
|---|---|---|
| CN | 101587373 A | 11/2009 |
| CN | 103279452 A | 9/2013 |

(Continued)

OTHER PUBLICATIONS

Office Action for CN 202110990091.8 by China National Intellectual Property Administration dated Apr. 27, 2024.

(Continued)

*Primary Examiner* — Laurie A Ries
(74) *Attorney, Agent, or Firm* — Sand, Sebolt & Wernow Co., LPA (57) ABSTRACT

The present disclosure relates to the method and apparatus for typesetting text, an electronic device, and a storage medium, which relates to the field of computer technology. The method includes: determining an original font in a target text in a collaborative document; determining whether a first terminal in the collaborative terminals supports the original font; in response to determining that the first terminal does not support the original font, obtaining character size data of the original font; in response to determining that the first terminal obtains the character size data of the original font, displaying the target text in a first font supported by the first (Continued)

FIG. 3A

FIG. 3B terminal, and typesetting the target text in the first font according to the character size data of the original font.

20 Claims, 4 Drawing Sheets

(56) References Cited

U.S. PATENT DOCUMENTS

| | | | | |
|---|---|---|---|---|
| 9,317,485 | B2 * | 4/2016 | Dent | G06Q 10/107 |
| 9,471,550 | B2 * | 10/2016 | Boutelle | G06F 40/154 |
| 10,373,029 | B2 * | 8/2019 | Nakahara | G06K 15/1802 |
| 2009/0109227 | A1 | 4/2009 | Leroy | |
| 2011/0115797 | A1 * | 5/2011 | Kaplan | G06T 11/203 |
| | | | | 715/269 |
| 2012/0079374 | A1 | 3/2012 | Gaddis | |
| 2013/0325795 | A1 * | 12/2013 | Harris | G06F 16/9577 |
| | | | | 707/608 |
| 2014/0089790 | A1 * | 3/2014 | Oh | G06F 40/109 |
| | | | | 715/269 |
| 2014/0115453 | A1 * | 4/2014 | Lee | G06F 40/10 |
| | | | | 715/269 |
| 2015/0154152 | A1 * | 6/2015 | Konnola | G06F 40/109 |
| | | | | 715/269 |
| 2015/0242373 | A1 | 8/2015 | Xue | |
| 2016/0196676 | A1 * | 7/2016 | Chapman | G06F 40/109 |
| | | | | 345/467 |
| 2017/0004113 | A1 * | 1/2017 | Gore | G06F 40/109 |
| 2018/0114059 | A1 * | 4/2018 | Ric | G06V 30/36 |
| 2018/0157625 | A1 * | 6/2018 | Chang | G06F 40/106 |

FOREIGN PATENT DOCUMENTS

| | | | | |
|---|---|---|---|---|
| CN | 103312793 | A | | 9/2013 |
| CN | 103699520 | A | | 4/2014 |
| CN | 103902513 | A | | 7/2014 |
| CN | 102612690 | B * | 3/2016 | ............. G06F 40/19 |
| CN | 111199137 | A | | 5/2020 |
| CN | 106844481 | B | | 1/2021 |
| CN | 113051235 | A | | 6/2021 |
| CN | 113283217 | A | | 8/2021 |
| CN | 113642290 | A | | 11/2021 |
| CN | 110362790 | B * | 10/2023 | ........... G06F 40/109 |
| JP | 2001-5985 | A | | 1/2001 |
| KR | 10-2021-0060808 | A | | 5/2021 |
| TW | 201243624 | A | | 11/2012 |
| WO | WO-2014206108 | A1 * | 12/2014 | ......... G06F 16/9577 |
| WO | WO-2021115212 | A1 * | 6/2021 | ........... G06F 1/3293 |

OTHER PUBLICATIONS

Extended European Search Report for EP 21954892.2 by European Patent Office dated Jul. 3, 2025.
Office Action for JP 2024-513148 by Japan Patent Office dated Apr. 22, 2025.
International Search Report & Written Opinion for PCT/CN2021/142056 by China National Intellectual Property Administration dated Apr. 29, 2022.

* cited by examiner

TEXT TYPESETTING

CROSS-REFERENCE TO RELATED APPLICATIONS

This application is a National Phase Entry Application of PCT Application No. PCT/CN2021/142056 filed on Dec. 28, 2021, which claims priority to Chinese Patent Application No. 202110990091.8 filed on Aug. 26, 2021, in the China National Intellectual Property Administration, the entire contents of which are hereby incorporated by reference in its entirety.

TECHNICAL FIELD

The present disclosure relates to the field of computer technology, in particular to methods and apparatuses for typesetting text, electronic devices, and storage media.

BACKGROUND

More and more applications have launched online collaborative document functions, such as multi-person editing and viewing of online documents. When one or more users view the same online document on different devices, missing a certain font may result in significant differences in the typesetting of the document on different devices, affecting the aesthetics and consistency of the reading experience of the document. The general approach is to install the corresponding font in the current environment. However, this approach requires searching, downloading, and installing fonts, and the fonts may also require payment, which makes it difficult to promote and apply on a large scale. Therefore, it is necessary to propose a new method for typesetting text.

SUMMARY

A purpose of the embodiments of the present disclosure is to provide a new technical solution for typesetting text to maintain consistency in typesetting for online collaborative document in a case of the absence of a font.

According to the first aspect of the present disclosure, a method for typesetting text is provided. The method is applied to collaborative terminals for a collaborative document. The method includes: determining an original font in a target text in the collaborative document; determining whether a first terminal in the collaborative terminals supports the original font; in response to determining that the first terminal does not support the original font, obtaining, by the first terminal, character size data of the original font; in response to determining that the first terminal obtains the character size data of the original font, displaying the target text in a first font supported by the first terminal; and typesetting, by the first terminal, the target text in the first font according to the character size data of the original font.

According to the second aspect of the present disclosure, an apparatus for typesetting text is provided. The apparatus is applied to collaborative terminals for a collaborative document. The apparatus includes: a first determining module, configured to determine an original font in a target text in the collaborative document; a second determining module, configured to determine whether a first terminal in the collaborative terminals supports the original font; an obtaining module, configured to, in response to determining that the first terminal does not support the original font, obtain character size data of the original font; a typesetting module, configured to, in response to determining that the first terminal obtains the character size data of the original font, display the target text in a first font supported by the first terminal; and typeset, by the first terminal, the target text in the first font according to the character size data of the original font.

According to the third aspect of the present disclosure, an electronic device is further provided. The electronic device includes: one or more memories and one or more processors, wherein the one or more memories store a computer program, and the one or more processors, when executing the computer program, implement the method according to the first aspect of the present disclosure.

According to the fourth aspect of the present disclosure, a computer-readable storage medium is further provided. The storage medium stores a computer program, and the computer program when executed by one or more processors achieves the method according to the first aspect of the present disclosure.

A beneficial effect of the embodiments of the present disclosure is that for a collaborative document with online multi-person collaboration, if a collaborative terminal does not support an original font of a target text in the collaborative document, a first font that is supported by the collaborative terminal can be used to display the target text and the target text can be typeset according to the character size data of the original font, which enables the collaborative terminal to maintain typesetting consistency with other collaborative terminals even when the original font is absent. The method for typesetting text provided in the embodiments of the present disclosure is applied to multi-person editing for an online document.

By providing a detailed description of the exemplary embodiments of the present disclosure with reference to the accompanying drawings, other features and advantages of the embodiments of the present disclosure will become clear.

BRIEF DESCRIPTION OF DRAWINGS

Accompanying drawings herein are incorporated into and constitute part of the specification, illustrate embodiments of the present disclosure, and are combined with the description to explain the principle of the present disclosure.

DETAILED DESCRIPTION

Various exemplary embodiments of the present disclosure are described herein in detail with reference to the accompanying drawings. It should be noted that, unless otherwise specified, the relative arrangement of the components and steps, numerical expressions, and values described in the embodiments do not limit the scope of the present disclosure.

The following description of at least one exemplary embodiment is only for illustrative purposes and shall not be construed as any limitation on the present disclosure, application, or use thereof.

The techniques, methods, and devices known to ordinary technical personnel in the relevant field may not be discussed in detail, but in appropriate cases, such techniques, methods, and devices should be considered as part of the specification.

In all the examples shown and discussed here, any specific value should be interpreted as merely illustrative and not as a limitation. Therefore, other examples of exemplary embodiments may have different values.

It should be noted the similar reference signs and letters in the following drawings indicate similar items, therefore, once an item is defined in one drawing, it does not need to be further discussed in subsequent drawings.

<Method for Typesetting Text>

Figure 1:
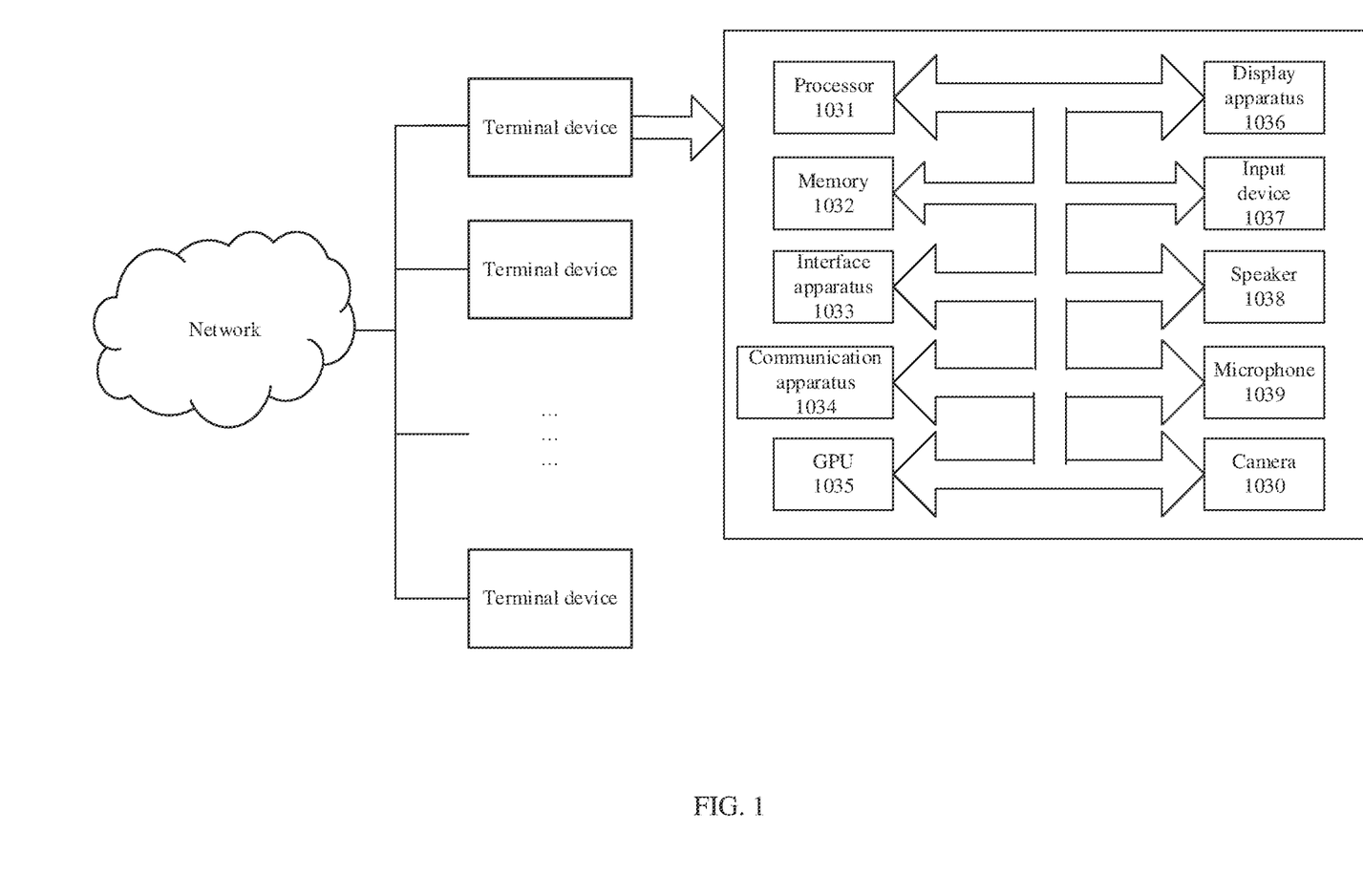
FIG. 1 is a schematic diagram of an online document collaboration system provided in the embodiments of the present disclosure.

FIG. 1 is a schematic diagram of an online document collaboration system provided in the embodiments of the present disclosure. As shown in FIG. 1, the online document collaboration system includes a plurality of terminal devices, which can communicate with each other through a network.

The terminal device may be, for example, an electronic device installed with an intelligent operating system (for example, Android, IOS, Windows, Linux, etc.), including but not limited to a portable computer, a desktop computer, a mobile phone, a tablet computer, and the like. The configuration of the terminal device includes, but is not limited to, a processor 1031, a memory 1032, an interface apparatus 1033, a communication apparatus 1034, a graphics processing unit (GPU) 1035, a display apparatus 1036, an input apparatus 1037, a speaker 1038, a microphone 1039, and a camera 1030. The processor 1031 includes, but is not limited to, a central processing unit (CPU), a microprocessor unit (MCU), and the like. The memory 1032 includes, but is not limited to, ROM (Read Only Memory), RAM (Random Access Memory), non-volatile memory such as a hard disk, and the like. The interface device 1033 includes, but is not limited to, a USB interface, a serial interface, a parallel interface, and the like. The communication device 1034 can perform wired or wireless communication, specifically including Wi-Fi communication, Bluetooth communication, 2G/3G/4G/5G communication, etc. The GPU 1035 is used for image processing. The display device 1036 includes but is not limited to a liquid crystal display (LCD) screen, a touch screen, etc. The input device 1037 includes but is not limited to a keyboard, a mouse, a touch screen, etc. Alternatively, the configuration of the terminal device may include only some of the foregoing apparatuses.

In an embodiment of the present disclosure, User A may submit a collaborative document through a terminal device, and select one or more collaborators to start an online multi-person collaboration function. Afterwards, all selected collaborators and user A can use their respective terminal devices to view the collaborative document and collaborate on editing the collaborative document, and these terminal devices are the collaborative terminals for the collaborative document.

In an embodiment of the present disclosure, the online multi-person collaboration function may be implemented according to a target application, and the user may submit a collaborative document on the target application and view and collaborate on editing the collaborative document on the target application. In an example, the user pre-registers an account on the target application, opens the target application using the terminal device, and logs in to the account to use the online multi-person collaboration function. The target application running on the terminal device is the collaborative terminal application of the collaborative document.

In an example, the target application is, for example, a document editing software, an instant messaging software, an office software, a browser, or the like.

In an example, the target application can be a native application, a web application, a hybrid application, a lightweight application, or the like. A native application refers to an application program that can run directly on a current operating system. A web application refers to a web application that needs to run in a browser. A hybrid application can be a combination of a native application and a web application, and typically, a native application embedded with a browser. A light application is an application that can be used without downloading or installing, and users can search it to use or scan a code to use it.

In response to determining that it is allowed to use the same account to log in to the target application on multiple terminal devices, each terminal device can be considered as a collaborative terminal. That is, users of the same account can use two or even more collaborative terminals to view a target text and collaborate on editing the target text.

The online document collaboration system shown in FIG. 1 is only illustrative and does not imply any restrictions on the embodiments of the present disclosure, application, or use thereof. Those skilled in the art should understand that, although a plurality of apparatuses of the terminal device are described above, the embodiments of the present disclosure may relate to only some of the apparatuses. For example, the terminal device can only involve a processor, a memory, a communication device, an input device, and a display screen. Those skilled in the art can design the instructions according to the solutions disclosed by the embodiments of the present disclosure. How the instructions control the processor to perform operations is a well-known technology in this field, which will not be described in detail here.

Figure 2:
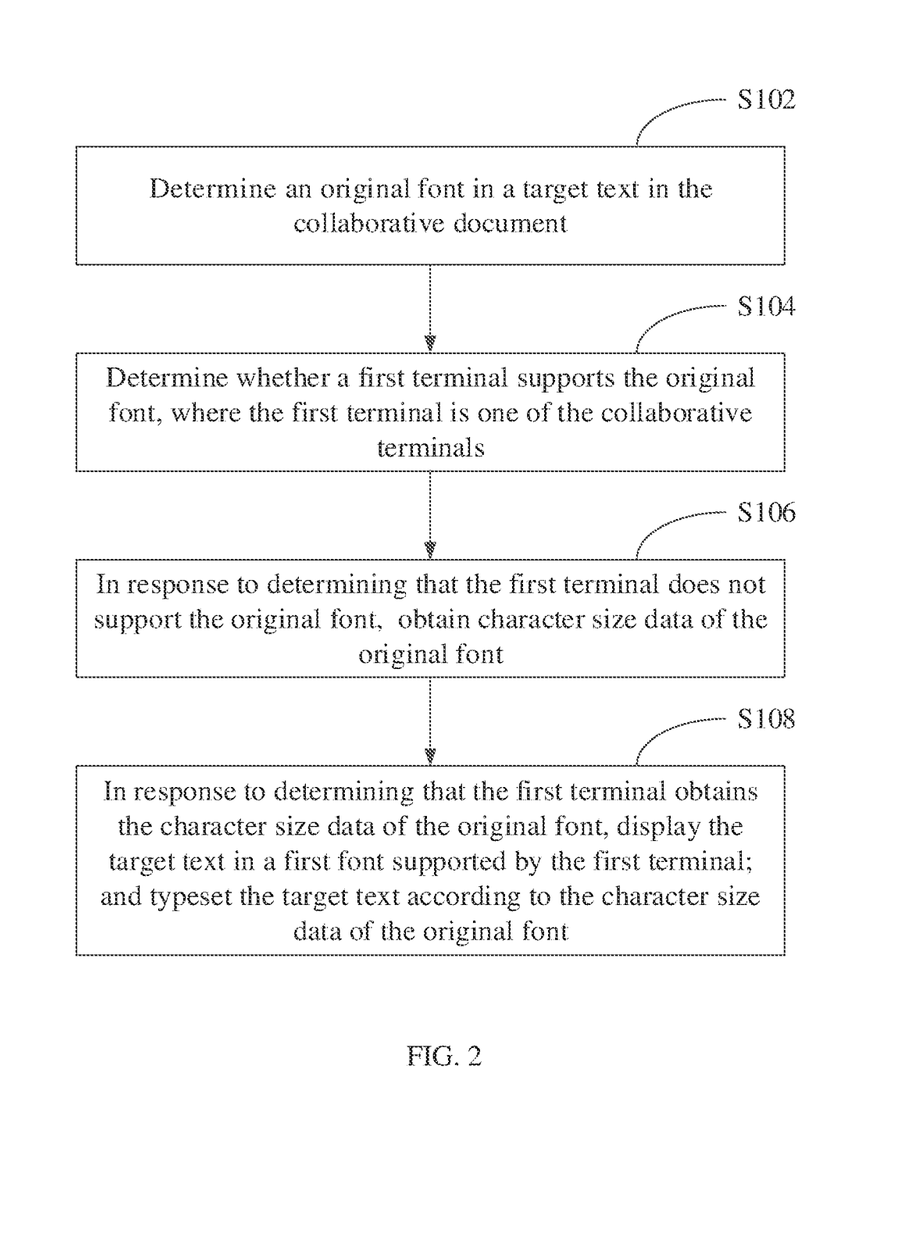
FIG. 2 is a flowchart of a method for typesetting text provided in the embodiments of the present disclosure.

As shown in FIG. 2, the embodiments of the present disclosure provide a text typesetting method, including steps S102-S108. The steps S102-S108 can be implemented by a first terminal. The first terminal is one of the collaborative terminals for the collaborative document.

In step S102, an original font in a target text in the collaborative document is determined.

In the embodiments of the present disclosure, the target text may be any part of the text in the collaborative document. In an embodiment, the first terminal obtains information of the original font of the target text from the collaborative document, to determine the original font used in the target text. In general, the information of the original font can be stored in the document data of the collaborative document. In an embodiment, the information of the original font may be an identifier, a name, a code, and the like of the font.

In the embodiments of the present disclosure, the font may include a font loaded in the operating system of the terminal device, a font loaded in the client (such as a browser or an application) of the terminal device, a font stored in the server, or a font carried in a document file. A document file can carry fonts, but a document file that carries fonts usually has a relatively large amount of data. The fonts loaded in the operating system of the terminal device, the fonts loaded in the client of the terminal device, and the fonts carried in the document file are all fonts that the terminal device can support, and can be collectively referred to as local fonts. The fonts stored on the server can be referred to as server fonts or cloud fonts.

In step S104, it is determined whether a first terminal supports the original font.

In the embodiments of the present disclosure, after determining the original font used in the target text, the first terminal checks whether all fonts supported by the first terminal include the original font; and if not, it is determined that the first terminal does not support the original font. For example, if the operating system of the first terminal or the client of the first terminal loads the original font, or if the original font is stored in the target text (or the collaborative document), it is considered that the first terminal supports the original font, otherwise, the first terminal does not support the original font.

The fonts supported by the first terminal can be determined according to the font package installed. In an embodiment, if the first terminal installs a font package for a certain font, it indicates that the first terminal supports that font. Generally, a basic data package of an operating system of a terminal device or a basic data package of an application of a terminal device will have multiple widely used font packages pre-installed, and one of the fonts can be set as a default font. If users want to use some non-popular and special fonts, they need to specifically download the corresponding font packages.

In step S106, in response to determining that the first terminal does not support the original font, character size data of the original font is obtained by the first terminal.

The characters in the embodiments of the present disclosure include but are not limited to words and symbols. Words include but are not limited to Chinese characters, letters, etc. Symbols include but are not limited to punctuation marks, numerical symbols, mathematical symbols, special symbols, emoticons, etc.

In the embodiments of the present disclosure, the character size data of the font includes the height and width of a character. The character size data of the original font includes the character width and the character height of the original font, which are the width and height of the characters in the target text in the original font. For the same font and under the same font size, different character sizes may be designed to be the same or different. If for the same font and under the same font size, all characters do not use the same size, then a mapping relationship between a character and the width and height of the character is established. In this way, the mapping relationship can be used as the character size data for the corresponding font, and the character size of each character under the corresponding font size can be found according to a mapping relationship.

Figure 3A:
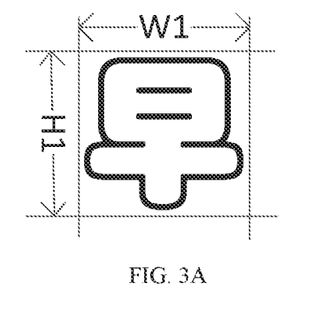
FIGS. 3A and 3B are schematic diagrams of character size data provided in the embodiments of the present disclosure.
Figure 3B:
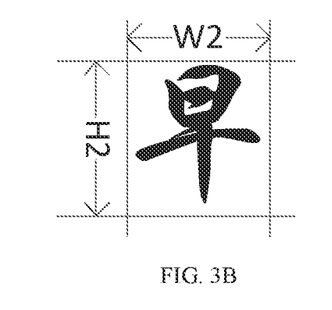

As shown in FIGS. 3A and 3B, for the same Chinese character "早", the width and height of two different fonts under the same font size are different. The width and height of the font shown in FIG. 3B are smaller than the width and height of the font shown in FIG. 3A.

In an embodiment, the character size data of a font is obtained by measuring the size of the character. For example, in collaborative terminals, if a collaborative terminal supports the original font, the collaborative terminal can display the target text in the original font, measure the size (specifically the width and height of the character) of the character of the target text in the original font, and obtain the character size data of the original font.

In another embodiment, the information of the original font includes the character size data of the original font. Furthermore, the character size data of the original font can be read out from the information of the original font.

In an embodiment, the first terminal can obtain character size data of the original font that is shared by another collaborative terminal in the collaborative terminals. That is, according to an online multi-person collaboration relationship, if the first terminal does not support the original font, if a collaborative terminal other than the first terminal supports the original font, the collaborative terminal that supports the original font can share the character size data of the original font between the collaborative terminals, such that the first terminal can obtain the size data of the original font.

In an embodiment, the collaborative terminal that shares character size data of the original font can be referred to as the second terminal, and the second terminal supports the original font. For a process of determining the second terminal in the cooperative terminals, refer to subsequent step S202. In an embodiment, after the first terminal obtains the character size data of the original font from the second terminal, the character size data can be stored in the local cache of the first terminal, such that the next time the font needs to be used, the character size data of the font can be directly read from the local cache.

In an embodiment, the first terminal obtaining the character size data of the original font can include querying the character size data of the original font in a local cache of the first terminal.

In an embodiment, the first terminal obtaining the character size data of the original font can include querying the character size data of the original font in a local cache of the first terminal. In response to determining that the character size data of the original font cannot be queried in the local cache of first terminal, the character size data of the original font can be obtained from the second terminal. In an embodiment, after the first terminal obtains the character size data of the original font, the character size data can be stored in the local cache, such that the next time the font needs to be used, the character size data of the font can be directly read from the local cache.

The first terminal obtaining the character size data of the original font from the second terminal can include steps S202-S204.

In Step S202, a font query request for the original font can be broadcast between the collaborative terminals to determine the second terminal.

In an embodiment, when a terminal becomes a collaborative terminal for a collaborative document, notification information of "join collaboration" will be broadcast. Correspondingly, when a terminal exits collaboration and no longer serves as the collaborative terminal for the collaborative document, notification information of "exist collaboration" will be broadcast. In this way, the collaborative terminal for the collaborative document can determine the number of collaborative terminals according to the received notification information. For example, the number of collaborative terminals is the difference between the number of "join collaboration" notification information received and the number of "exit collaboration" notification information received. In response to determining that the first terminal does not support the original font, if the number of collaborative terminals reaches 2 or more, the first terminal broadcasts a font query request between collaborative terminals to determine the second terminal.

The process of the first terminal broadcasting the font query request between the collaborative terminals to determine the second terminal may include steps S2022-S2024.

In step S2022, the font query request is broadcast between collaborative terminals, to determine a collaborative terminal supporting the original font as a candidate terminal.

In step S2024, in response to determining that a quantity of candidate terminals is equal to 1, the candidate terminal is determined as the second terminal. In response to determining that a quantity of candidate terminals is greater than 1, a candidate terminal satisfying a preset condition is determined as the second terminal.

The preset condition can include at least one of the following conditions a-c:

For condition a, communication quality between the candidate terminal and the first terminal is the best. For example, the candidate terminal with the lowest network latency between the first terminal and the candidate terminal can be determined as the candidate terminal with the best communication quality.

For condition b, a quantity of font assistance requests received by the candidate terminal is the smallest. The candidate terminal that receives the least number of font assistance requests is relatively idle, and using it as a second terminal is beneficial for improving overall efficiency.

For condition c, a quantity of font query requests submitted by the candidate terminal is the smallest. The candidate terminal with the least number of font query requests is relatively idle, and using it as a second terminal is beneficial for improving overall efficiency.

In an embodiment, when the first terminal determines that the first terminal does not support the original font, that is, when the first terminal locally lacks the original font, an information queue is created to add a font query request to the information queue, to broadcast the font query request between the collaborative terminals for the collaborative document. When each collaborative terminal for a collaborative document receives the font query request, it is determined whether the collaborative terminal supports the original font, and in a case of determining that the collaborative terminal supports the original font, first response information is transmitted to the first terminal. The first response information represents the collaborative terminal supporting the original font. When the first terminal receives the first response information of a font query request transmitted by another collaborative terminal, the collaborative terminal can be determined as the second terminal.

In step S204, a font assistance request for the original font is transmitted to the second terminal, to obtain character size data of the original font from the second terminal.

The first terminal transmits a font assistance request to the second terminal, and when the second terminal receives the font assistance request, the second terminal transmits the character size data corresponding to the original font to the first terminal. In an embodiment, the second terminal, when receiving a font assistance request, performs character measurement on the original font, to obtain the character size data of the original font.

In step S108, in response to determining that the first terminal obtains the character size data of the original font, the target text is displayed in a first font supported by the first terminal; and the target text is typeset according to the character size data of the original font. The first font can be the font that best matches the character size data of the original font among all fonts supported by the first terminal. In an embodiment, the method of determining the first font can include: in the case where the typesetting direction of the target text is horizontal, calculating the difference between the character width of the character in the target text in the original font and the character width of the character in the target text in each font supported by the first terminal as the first difference, and the smaller the absolute value of the first difference, the closer the character width for the corresponding font supported by the first terminal is to the character width for the original font. The font supported by the first terminal with the smallest absolute value of the first difference is selected as the first font; when the typesetting direction of the target text is vertical, calculating the difference between the character height of the character in the target text in the original font and the character height of the character in the target text in each font supported by the first terminal as the second difference, and the smaller the absolute value of the second difference, the closer the character height for the corresponding font supported by the first terminal is to the character height for the original font. The font supported by the first terminal with the smallest absolute value of the second difference is selected as the first font.

The first terminal typesets the target text displayed in the first font according to the character size data of the original font, which can be done in various ways. The following are examples to illustrate.

EXAMPLE 1

First, the typesetting direction of the target text is determined, and the target text displayed in the first font on the first terminal is typeset according to the typesetting direction of the target text.

In response to determining that the typesetting direction of the target text is horizontal, first scaling is performed on a character of the target text in the first font to enable character width of the target text in the first font to be consistent with character width of the target text in the original font. In response to determining that the typesetting direction of the target text is vertical, second scaling is performed on a character of the target text in the first font to enable character height of the target text in the first font to be consistent with character height of the target text in the original font.

In Example 1, the scaling of the character can be achieved by adjusting the font size.

In an embodiment, in step S108, typesetting the target text displayed on the first terminal according to the character size data of the original font includes: obtaining the character size data of the first font, and typesetting the target text displayed on the first terminal according to the character size data of the original font and the character size data of the first font.

EXAMPLE 2

First, the typesetting direction of the target text is determined, and the target text displayed in the first font on the first terminal is typeset according to the typesetting direction of the target text.

When the typesetting direction of the target text is horizontal, the first difference is determined, and the first difference is the difference between the character width of the target text in the original font and the character width of the target text in the first font. In response to determining that the first difference is a positive value, the abscissa value of the characters in the target text is adjusted. In response to determining that the first difference is a negative value, the characters in the target text is scaled down.

When the typesetting direction of the target text is vertical, the second difference is determined, and the second difference is the difference between the character height of the target text in the original font and the character height of the target text in the first font. In response to determining that the second difference is a positive value, the ordinate value of the characters in the target text is adjusted. In response to determining that the second difference is a negative value, the characters in the target text is scaled down.

In Example 2, the reducing of a size of the character can be achieved by adjusting the font size.

Taking the typesetting direction of the target text being horizontal as an example for illustration.

As shown in FIG. 3A, each character in the target text in the original font has a character width of approximately W1. As shown in FIG. 3B, each character in the target text in the first font has a character width of approximately W2. The difference DW (=W1–W2) between W1 and W2 is calculated as the first difference.

If the first difference DW is a positive value, it indicates that the character width for the first font is smaller than the character width for the original font. Therefore, it is necessary to adjust the abscissa value of each character in the target text in the first font.

Figure 4:
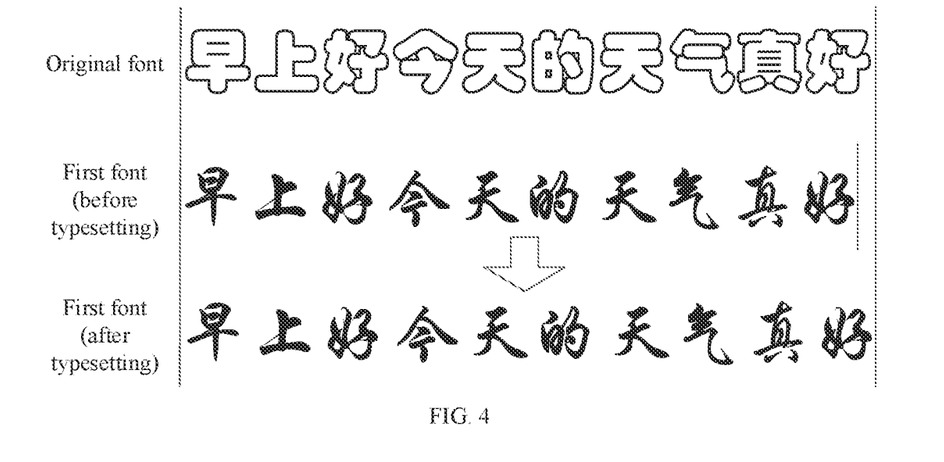
FIG. 4 is a schematic diagram of a method for typesetting text provided in the embodiments of the present disclosure.

As shown in FIG. 4, the target text is a line of content that includes 10 Chinese characters " 早上好今天的 天气真好". In the original font, the abscissa values of the 10 Chinese characters are $X_1, X_2, \ldots, X_{10}$. After typesetting, the abscissa values of the 10 Chinese characters are $X_1', X_2', \ldots, X_{10}'$, then:

$$X_1' = X_1 + 0.5 * DW,$$
$$X_2' = X_2 + (2-1) * DW + 0.5 * DW,$$
$$\ldots$$
$$X_n' = X_n + (n-1) * DW + 0.5 * DW,$$
$$\ldots$$
$$X_{10}' = X_{10} + (10-1) * DW + 0.5 * DW,$$

wherein n is an integer, and 1≤n≤10.

It can be seen that adjusting the abscissa value of each character in the line of content in the first font is equivalent to adjusting the spacing between adjacent characters in the line of content.

If the first difference value DW is a negative value, it means that the width of the characters in the first font is greater than the width of the characters in the original font. If the coordinate values are adjusted, it may cause overlap between characters. Therefore, it is necessary to reduce the font size of the target text displayed in the first font on the first terminal and keep the original position (coordinate values) of the target text in the first font unchanged. In an embodiment, the font size of the target text displayed by the first terminal in the first font is reduced according to the ratio of W1/W2. For example, W1/W2=R1, assuming the original font size of this content is U1, the font size of this content is adjusted to U2, wherein U2=R1*U1. The font size described in the present disclosure is in a point system, which is a measurement method for printing fonts well known to those skilled in the art, such as 5 points, 12 points, etc.

Taking the typesetting direction of the target text being vertical as an example for illustration.

As shown in FIG. 3A, each character in the original font has a character height of approximately H1. As shown in FIG. 3B, each character in the first font has a character height of approximately H2. The difference DH (=H1–H2) between H1 and H2 is calculated as the second difference.

If the second difference DH is a positive value, it indicates that the character height for the first font is smaller than the character height for the original font. Therefore, the ordinate value of each character in the target text in the first font is adjusted.

Assuming that the target text in the original font has a total of M lines of content, and the ordinate values of the characters in each line are the same. The ordinate values of the characters from the first line to the M-th line are $Y_1, Y_2, \ldots, Y_M$. After typesetting, the ordinate values of the characters from the first line to the M-th line are $Y_1', Y_2', \ldots, Y_M'$, then:

$$Y_1' = Y_1 + 0.5 * DH,$$
$$Y_2' = Y_2 + (2-1) * DH + 0.5 * DH,$$
$$\ldots$$
$$Y_m' = Y_m + (m-1) * DH + 0.5 * DH,$$
$$\ldots$$
$$Y_M' = Y_M + (M-1) * DH + 0.5 * DH,$$

wherein m is an integer, and 1≤m≤M.

It can be seen that adjusting the ordinate values of each character in the target text in the first font is equivalent to adjusting the line spacing between adjacent lines of the target text.

If the second difference value DH is a negative value, it means that the height of the characters in the first font is greater than the height of the characters in the original font. If the coordinate values are adjusted, it may cause overlap between characters. Therefore, it is necessary to reduce the font size of the target text displayed in the first font on the first terminal. In an embodiment, the font size of the target text displayed in the first font on the first terminal is reduced according to the ratio of H1/H2, and the original position (coordinate values) of the target text in the first font is kept unchanged. For example, H1/H2=R2, assuming the original font size of the target text is U1, the font size is adjusted to U2, wherein U2=R2*U1.

EXAMPLE 3

First, the typesetting direction of the target text is determined, and the target text displayed in the first font on the first terminal is typeset according to the typesetting direction of the target text.

When the typesetting direction of the target text is horizontal, the font size of the target text in the first font is adjusted to the first font size, wherein character width of the target text of the first font size in the first font is closest to character width of the target text in the original font. After the font size of the target text is adjusted to the first font size, a first difference is determined, wherein the first difference is the difference between character width of the target text in the original font and character width of the target text in the first font. In response to determining that the first difference is a positive value, the abscissa value of the characters in the target text is adjusted. In response to determining that the first difference is a negative value, the characters in the target text is scaled down.

That is, in response to determining that the typesetting direction of the target text is horizontal, the first terminal adjusts the font size of the target text in the first font to the first font size. Then, if the character width is still greater than the character width in the original font, the font size is lowered by one to reduce the font size and avoid overlapping characters.

When the typesetting direction of the target text is vertical, the font size of the target text in the first font is adjusted to the second font size, wherein character height of the target text of the second font size in the first font is closest to character height of the target text in the original font. After the font size of the target text is adjusted to the second font size, a second difference is determined, wherein the second difference is the difference between character height of the target text in the original font and character height of the target text in the first font. In response to determining that the second difference is a positive value, the ordinate value of the characters in the target text is adjusted. In response to determining that the second difference is a negative value, the characters in the target text is scaled down.

That is, in response to determining that the typesetting direction of the target text is vertical, the first terminal adjusts the font size of the target text in the first font to the second font size. Then, if the character height is still greater than the character height in the original font, the font size is lowered by one to reduce the font size and avoid overlapping characters.

In Example 3, the reducing of a size of the character can be achieved by adjusting the font size.

After the first terminal typesets the target text displayed in the first font, the typesetting of the target text displayed in the first font is closer to the typesetting of the target text displayed in the original font. As shown in FIG. 4, for the target text "早上好今天 的大气真好", the total width of the content in the original font is wider compared to the typesetting in the first font. After the typesetting of step S108, the total width of the content displayed in the first font on the first terminal is closer to the total width of the content in the original font. Through this approach, it can be ensured that the same line of content in the original font will not be split due to using the first font for display, thereby avoiding the problem of collaborative terminals being unable to synchronize and collaborate due to typesetting differences.

A beneficial effect of the embodiments of the present disclosure is that for a collaborative document with online multi-person collaboration, if a collaborative terminal does not support an original font of a target text in the collaborative document, a first font that is supported by the collaborative terminal can be used to display the target text and the target text can be typeset according to the character size data of the original font, which enables the collaborative terminal to maintain typesetting consistency with other collaborative terminals even when the original font is absent.

In response to determining that the first terminal fails to obtain the character size data of the original font, the method may further include steps S902-S904.

In step S902, it is determined whether a first terminal supports the target font. The target font is determined by the collaborative terminals from candidate fonts according to a preset negotiation mechanism in response to determining that the collaborative terminals do not support the original font, and the candidate fonts are supported by any one of the collaborative terminals.

In an embodiment, a font supported by a collaborative terminal that first transmits a font query request can be determined as the target font. The collaborative terminal that first transmits the font query request is usually relatively idle and more efficient than other collaborative terminals. In an embodiment, a score of each of the candidate fonts can be determined, and a candidate font with a highest score can be determined as the target font. The score of the candidate font is a quantity of collaborative terminals that support the candidate font.

In step S904, in response to determining that the first terminal supports the target font, the target text in the target font is displayed by the first terminal. In response to determining that the first terminal does not support the target font, the first terminal obtains character size data of the target font from the third terminal, displays the target text in the second font that is supported by the first terminal, and typesets the target text displayed in the second font according to the character size data of the target font. The third terminal is a collaborative terminal that supports the target font. The second font is supported by the first terminal that best matches the target font. The approach of determining the second font can be similar to the process of determining the first font mentioned above. For example, the second font can be the same as the first font.

The process in which the first terminal obtains the character size data of the target font from the third terminal is similar to the process in which the first terminal obtains the character size data of the original font from the second terminal.

A beneficial effect of the embodiments of the present disclosure is that for collaborative documents with online multi-person collaboration, if all collaborative terminals do not support the original font of the target text in the collaborative document, a font can be determined according to a preset negotiation mechanism as the target font, and each collaborative terminal uniformly uses the target font to display the target text, so that each collaborative terminal can still maintain typesetting consistency with other collaborative terminals in the absence of the original font.

In response to determining that the first terminal supports the original font, the method may further include: the first terminal displays the target text in the original font and transmits character size data of the original font to the fourth terminal, wherein the fourth terminal is a collaborative terminal that does not support the original font.

In an embodiment, if the first terminal supports the original font, if the first terminal receives a font assistance request from the fourth terminal, the first terminal transmits the character size data corresponding to the original font to the fourth terminal. In an embodiment, if the first terminal supports the original font, the first terminal can share the character size data of the original font between collaborative terminals.

Apparatus Embodiment

The embodiments of the present disclosure provide an apparatus for typesetting text, applied to collaborative terminals for a collaborative document. The apparatus includes the following modules:
  a first determining module, configured to determine an original font in a target text in the collaborative document;
  a second determining module, configured to determine whether a first terminal in the collaborative terminals supports the original font;

a first obtaining module, configured to, in response to determining that the first terminal does not support the original font, obtain character size data of the original font; and a typesetting module, configured to, in response to determining that the first terminal obtains the character size data of the original font, typeset, by the first terminal, the target text in the first font according to the character size data of the original font.

In an embodiment, obtaining, by the first terminal, the character size data of the original font includes: obtaining, by the first terminal, the character size data of the original font shared between the collaborative terminals by a second terminal in the collaborative terminals.

In an embodiment, obtaining, by the first terminal, the character size data of the original font includes: querying a local cache of the first terminal for the character size data of the original font; or obtaining the character size data of the original font from a second terminal, wherein the second terminal is one of the collaborative terminals, and the second terminal supports the original font.

In an embodiment, obtaining, by the first terminal, the character size data of the original font includes: querying the character size data of the original font in a local cache of the first terminal; and in response to determining that the character size data of the original font cannot be queried in the local cache of the first terminal, obtaining the character size data of the original font from a second terminal, wherein the second terminal is one of the collaborative terminals, and the second terminal supports the original font.

In an embodiment, the first obtaining module includes a first request module and a second request module.

The first request module is used to broadcast a font query request between the collaborative terminals to determine the second terminal.

The second request module is used to transmit a font assistance request to the second terminal to obtain the character size data of the original font from the second terminal.

The first request module, when broadcasting the font query request between the collaborative terminals to determine the second terminal, is configured to: broadcast the font query request between collaborative terminals, to determine a collaborative terminal supporting the original font as a candidate terminal; in response to determining that a quantity of candidate terminals is equal to 1, determine the candidate terminal as the second terminal; in response to determining that a quantity of candidate terminals is greater than 1, determine a candidate terminal satisfying a preset condition as the second terminal.

In an embodiment, the first terminal further includes a third determining module, a second obtaining module, and a second typesetting module.

The third determining module is used to determine whether the first terminal supports the target font in response to determining that the first terminal fails to obtain the character size data of the original font. The target font is determined by the collaborative terminals from candidate fonts according to a preset negotiation mechanism in response to determining that the collaborative terminals do not support the original font, and the candidate fonts are supported by any one of the collaborative terminals.

The second acquisition module is configured to obtain character size data of the target font from the third terminal in response to determining that the third determining module determines that the first terminal does not support the target font.

The second typesetting module is configured to display the target text in the target font in response to determining that the third determining module determines that the first terminal supports the target font. The second typesetting module is configured to, in the case where the third determining module determines that the first terminal does not support the target font, display the target text in the second font supported by the first terminal, and according to the character size data of the target font, typeset the target text displayed in the first font supported by the first terminal. The third terminal is a collaborative terminal among collaborative terminals that supports the target font.

In an embodiment, the first terminal further includes a transmitting module.

The transmitting module is used to, in response to determining that the first terminal supports the original font, display the target text in the original font and transmit the character size data of the original font to the fourth terminal. The fourth terminal is one of the collaborative terminals, and the fourth terminal does not support the original font.

In an embodiment, the first typesetting module typesetting the target text in the first font according to the character size data of the original font includes: determining a typesetting direction of the target text; in response to determining that the typesetting direction of the target text is horizontal, determining a first difference between character width of the target text in the original font and character width of the target text in the first font; in response to determining that the first difference is positive, adjusting an abscissa value of a character in the target text; in response to determining that the first difference is negative, scaling down a character in the target text; and in response to determining that the typesetting direction of the target text is vertical, determining a second difference between character height of the target text in the original font and character height of the target text in the first font; in response to determining that the second difference is positive, adjusting an ordinate value of a character in the target text; in response to determining that the second difference is negative, scaling down a character in the target text.

In an embodiment, the first typesetting module typesetting the target text in the first font according to the character size data of the original font includes: determining a typesetting direction of the target text; in response to determining that the typesetting direction of the target text is horizontal, performing first scaling process on a character of the target text in the first font to enable character width of the target text in the first font to be consistent with character width of the target text in the original font; in response to determining that the typesetting direction of the target text is vertical, performing second scaling process on a character of the target text in the first font to enable character height of the target text in the first font to be consistent with character height of the target text in the original font.

In an embodiment, the first typesetting module typesetting the target text in the first font according to the character size data of the original font includes: determining a typesetting direction of the target text; in response to determining that the typesetting direction of the target text is horizontal, adjusting a font size of the target text in the first font to a first font size, wherein character width of the target text of the first font size in the first font is closest to character width of the target text in the original font; after the font size of the target text is adjusted to the first font size, determining a first difference between character width of the target text in the original font and character width of the target text in the first font; in response to determining that the first difference is positive, adjusting an abscissa value of a character in the target text; in response to determining that the first difference is negative, scaling down a character in the target text; in response to determining that the typesetting direction of the target text is vertical, adjusting a font size of the target text in the first font to a second font size, wherein character height of the target text of the second font size in the first font is closest to character height of the target text in the original font; after the font size of the target text is adjusted to the second font size, determining a second difference between character height of the target text in the original font and character height of the target text in the first font; in response to determining that the second difference is positive, adjusting an ordinate value of a character in the target text; in response to determining that the second difference is negative, scaling down a character in the target text.

Figure 5:
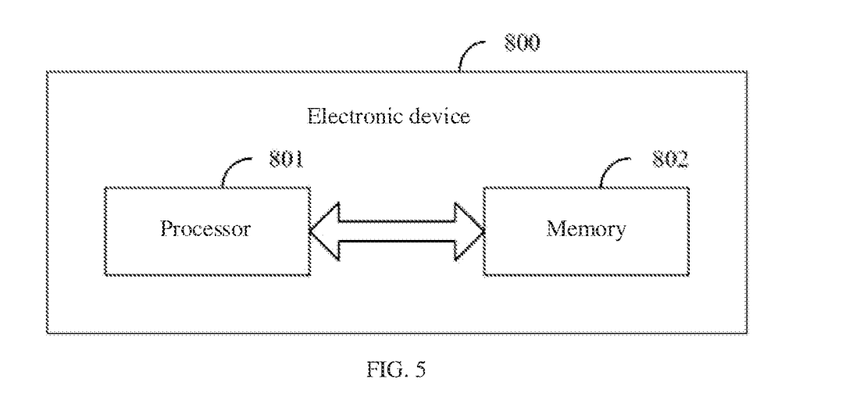
FIG. 5 is a schematic diagram of an electronic device according to the embodiments of the present disclosure.

FIG. 5 is a schematic diagram of the hardware structure of an electronic device according to an embodiment.

As shown in FIG. 5, the electronic device 800 includes a processor 801 and a memory 802. The memory 802 is used to store an executable computer program. The processor 801 is used to execute the computer program to implement the method for typesetting text according to any one of the above method embodiments.

The electronic device 800 can be a computer, mobile phone, tablet, or other device.

<Computer-Readable Storage Medium>

The embodiments of the present disclosure further provide a computer-readable storage medium, on which computer programs are stored. When the computer program is executed by a processor, a method for typesetting text according to any one of the above method embodiments is implemented.

The present disclosure may be a system, method, and/or computer program product. The computer program product may include a computer-readable storage medium that stores computer-readable program instructions for enabling the processor to implement various aspects of the present disclosure.

The computer-readable storage medium can be a tangible device that can maintain and store instructions used by instruction executing devices. The computer-readable storage medium may be, for example, but is not limited to, a storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. The computer-readable storage medium used here is not interpreted as the instantaneous signal itself, such as radio waves or other freely propagating electromagnetic waves, electromagnetic waves propagated through waveguides or other transmission media (such as optical pulses transmitted through fiber optic cables), or electrical signals transmitted through wires.

The computer-readable program instructions described here can be downloaded from computer-readable storage media to various computing/processing devices, or downloaded to external computers or storage devices through networks, such as the Internet, local area networks, wide area networks, and/or wireless networks. The network can include copper transmission cables, fiber optic transmission, wireless transmission, routers, firewalls, switches, gateway computers, and/or edge servers. The network adapter card or network interface in each computing/processing device receives computer-readable program instructions from the network and forwards them for storage in computer-readable storage media in each computing/processing device.

The computer program instructions used to perform the operations of the present disclosure may be assembler instructions, Instruction Set Architecture (ISA) instructions, machine instructions, machine related instructions, microcode, firmware instructions, state setting data, or source or object code written in any combination of one or more programming languages, including object-oriented programming languages such as Smalltalk, C++, etc, and conventional procedural programming languages such as C or similar programming languages. The computer-readable program instructions can be completely executed on the user's computer, partially executed on the user's computer, executed as an independent software package, partially executed on the user's computer and partially executed on a remote computer, or completely executed on a remote computer or server. In cases involving remote computers, remote computers can connect to user computers through any type of network, including local area networks (LANs) or wide area networks (WANs), or can connect to external computers (such as using internet service providers to connect via the internet). In some embodiments, personalized electronic circuits, such as programmable logic circuits, field programmable gate arrays (FPGAs), or programmable logic arrays (PLAs), can be customized by utilizing the state information of computer-readable program instructions, thereby implementing various aspects of the present disclosure.

Here, various aspects of the present disclosure are described with reference to the flowchart and/or block diagram of the method, device (system), and computer program product according to the embodiments of the present disclosure. It should be understood that each box in the flowchart and/or block diagram, as well as the combination of each box in the flowchart and/or block diagram, can be implemented by computer-readable program instructions.

These computer-readable program instructions can be provided to processors of general-purpose computers, specialized computers, or other programmable data processing devices to produce a machine. When these instructions are executed through a processor of a computer or other programmable data processing device, an apparatus that implements the functions/actions specified in one or more boxes in the flowchart and/or block diagram can be produced. These computer-readable program instructions can also be stored in a computer-readable storage medium, which enables the computer, programmable data processing device, and/or other devices to work in a specific way. Therefore, the computer-readable medium storing the instructions includes a manufacturing product, which includes instructions for implementing various aspects of the functions/actions specified in one or more boxes in the flowchart and/or block diagram.

The computer readable program instructions can also be loaded onto a computer, other programmable data processing devices, or other devices to perform a series of operational steps on the computer, other programmable data processing devices, or other devices, in order to generate a computer implementation process, thereby enabling the instructions executed on the computer, other programmable data processing devices, or other devices to implement the functions/actions specified in one or more boxes in the flowchart and/or block diagram.

The flowchart and block diagram in the attached drawings display the possible architecture, functions, and operations of the system, method, and computer program product according to multiple embodiments of the present disclosure. In this regard, each box in a flowchart or block diagram can represent a portion of a module, program segment, or instruction that contains one or more executable instructions for implementing a specified logical function. In some alternative implementations, the functions indicated in the box can also occur in a different order than those indicated in the accompanying drawings. For example, two consecutive boxes can actually be executed in basic parallel, and sometimes they can also be executed in opposite order, depending on the functionality involved. It should also be noted that each box in the block diagram and/or flowchart, as well as the combination of boxes in the block diagram and/or flowchart, can be implemented using dedicated hardware-based systems that perform specified functions or actions, or can be implemented using a combination of dedicated hardware and computer instructions. For those skilled in the art, it is well-known that implementation through hardware, software, and a combination of software and hardware are all equivalent.

The above has described the various embodiments of the present disclosure. The above explanation is illustrative and not exhaustive, and is not limited to the embodiments of the present disclosure. Many modifications and changes are obvious to those of ordinary skill in the art, without deviating from the scope and spirit of the described embodiments. The selection of terms used herein aims to best explain the principles, practical applications, or technological improvements in the market of each embodiment, or to enable others of ordinary skill in the art to understand the embodiments of the present disclosure. The scope of the present disclosure is limited by the appended claims.

The invention claimed is:

1. A method for typesetting text, applied to collaborative terminals for a collaborative document, wherein the method comprises:
    determining an original font in a target text in the collaborative document;
    determining whether a first terminal in the collaborative terminals supports the original font;
    in response to determining that the first terminal does not support the original font, obtaining, by the first terminal, character size data of the original font;
    in response to determining that the first terminal obtains the character size data of the original font, displaying the target text in a first font supported by the first terminal; and
    typesetting, by the first terminal, the target text in the first font according to the character size data of the original font.

2. The method according to claim 1, wherein obtaining, by the first terminal, the character size data of the original font comprises:
    obtaining, by the first terminal, the character size data of the original font shared between the collaborative terminals by a second terminal in the collaborative terminals.

3. The method according to claim 1, wherein obtaining, by the first terminal, the character size data of the original font comprises:
    querying a local cache of the first terminal for the character size data of the original font; or
    obtaining the character size data of the original font from a second terminal, wherein the second terminal is one of the collaborative terminals, and the second terminal supports the original font.

4. The method according to claim 3, wherein obtaining, by the first terminal, the character size data of the original font from the second terminal comprises:
    broadcasting, by the first terminal, a font query request between the collaborative terminals to determine the second terminal; and
    transmitting, by the first terminal, a font assistance request to the second terminal, to obtain the character size data of the original font from the second terminal.

5. The method according to claim 4, wherein broadcasting, by the first terminal, the font query request between the collaborative terminals to determine the second terminal comprises:
    broadcasting the font query request between collaborative terminals, to determine a collaborative terminal supporting the original font as a candidate terminal;
    in response to determining that a quantity of candidate terminals is equal to 1, determining the candidate terminal as the second terminal; and
    in response to determining that a quantity of candidate terminals is greater than 1, determining a candidate terminal satisfying a preset condition as the second terminal.

6. The method according to claim 5, wherein the preset condition comprises at least one of:
    communication quality between the candidate terminal and the first terminal being the best;
    a quantity of font assistance requests received by the candidate terminal being the smallest; or
    a quantity of font query requests submitted by the candidate terminal being the smallest.

7. The method according to claim 1, wherein obtaining, by the first terminal, the character size data of the original font comprises:
    querying the character size data of the original font in a local cache of the first terminal; and
    in response to determining that the character size data of the original font cannot be queried in the local cache of the first terminal, obtaining the character size data of the original font from a second terminal, wherein the second terminal is one of the collaborative terminals, and the second terminal supports the original font.

8. The method according to claim 1, wherein in response to determining that the first terminal fails to obtain the character size data of the original font, the method further comprises:
    determining whether the first terminal supports a target font, wherein the target font is determined by the collaborative terminals from candidate fonts according to a preset negotiation mechanism in response to determining that none of the collaborative terminals support the original font, and the candidate fonts are supported by any one of the collaborative terminals;
    in response to determining that the first terminal supports the target font, displaying, by the first terminal, the target text in the target font; and
    in response to determining that the first terminal does not support the target font, obtaining, by the first terminal, character size data of the target font from a third terminal; displaying, by the first terminal, the target text in a second font supported by the first terminal, wherein the third terminal is one of the collaborative terminals, and the third terminal supports the target font; and typesetting, by the first terminal, the target text in the second font according to the character size data of the target font.

9. The method according to claim 8, wherein in response to determining that none of the collaborative terminals support the original font, determining, by the collaborative terminals, the target font from the candidate fonts according to the preset negotiation mechanism comprises:
   determining a font supported by a collaborative terminal that first transmits a font query request from the collaborative terminals as the target font; or
   determining a score of each of the candidate fonts, and determining a candidate font with a highest score as the target font, wherein for each of the candidate fonts, the score of the candidate font is determined according to a quantity of collaborative terminals that support the candidate font.

10. The method according to claim 1, further comprising:
    in response to determining that the first terminal supports the original font, displaying, by the first terminal, the target text in the original font; and
    transmitting, by the first terminal, the character size data of the original font to a fourth terminal, wherein the fourth terminal is one of the collaborative terminals, and the fourth terminal does not support the original font.

11. The method according to claim 1, wherein the character size data of the original font comprises character width of the original font and character height of the original font; and typesetting, by the first terminal, the target text in the first font according to the character size data of the original font comprises:
    determining a typesetting direction of the target text;
    in response to determining that the typesetting direction of the target text is horizontal, determining a first difference between character width of the target text in the original font and character width of the target text in the first font; in response to determining that the first difference is positive, adjusting an abscissa value of a character in the target text; and in response to determining that the first difference is negative, scaling down a character in the target text; and
    in response to determining that the typesetting direction of the target text is vertical, determining a second difference between character height of the target text in the original font and character height of the target text in the first font; in response to determining that the second difference is positive, adjusting an ordinate value of a character in the target text; and in response to determining that the second difference is negative, scaling down a character in the target text.

12. The method according to claim 1, wherein the character size data of the original font comprises character width of the original font and character height of the original font; and typesetting, by the first terminal, the target text in the first font according to the character size data of the original font comprises:
    determining a typesetting direction of the target text;
    in response to determining that the typesetting direction of the target text is horizontal, performing first scaling on a character of the target text in the first font to enable character width of the target text in the first font to be consistent with the character width of the target text in the original font; and
    in response to determining that the typesetting direction of the target text is vertical, performing second scaling on a character of the target text in the first font to enable character height of the target text in the first font to be consistent with the character height of the target text in the original font.

13. The method according to claim 1, wherein the character size data of the original font comprises character width of the original font and character height of the original font; and typesetting, by the first terminal, the target text in the first font according to the character size data of the original font comprises:
    determining a typesetting direction of the target text;
    in response to determining that the typesetting direction of the target text is horizontal, adjusting a font size of the target text in the first font to a first font size, wherein character width of the target text of the first font size in the first font is closest to the character width of the target text in the original font; after the font size of the target text is adjusted to the first font size, determining a first difference between the character width of the target text in the original font and character width of the target text in the first font; in response to determining that the first difference is positive, adjusting an abscissa value of a character in the target text; and in response to determining that the first difference is negative, scaling down a character in the target text; and
    in response to determining that the typesetting direction of the target text is vertical, adjusting a font size of the target text in the first font to a second font size, wherein character height of the target text of the second font size in the first font is closest to the character height of the target text in the original font; after the font size of the target text is adjusted to the second font size, determining a second difference between the character height of the target text in the original font and character height of the target text in the first font; in response to determining that the second difference is positive, adjusting an ordinate value of a character in the target text; and in response to determining that the second difference is negative, scaling down a character in the target text.

14. An electronic device, comprising: one or more memories and one or more processors, wherein the one or more memories store a computer program, and the one or more processors, when executing the computer program, implement a method for typesetting text, wherein the method is applied to collaborative terminals for a collaborative document, and the method comprises:
    determining an original font in a target text in the collaborative document;
    determining whether a first terminal in the collaborative terminals supports the original font;
    in response to determining that the first terminal does not support the original font, obtaining, by the first terminal, character size data of the original font;
    in response to determining that the first terminal obtains the character size data of the original font, displaying the target text in a first font supported by the first terminal; and
    typesetting, by the first terminal, the target text in the first font according to the character size data of the original font.

15. A computer-readable storage medium, wherein the storage medium stores a computer program, and the computer program when executed by one or more processors achieves a method for typesetting text, wherein the method is applied to collaborative terminals for a collaborative document, and the method comprises:

determining an original font in a target text in the collaborative document;

determining whether a first terminal in the collaborative terminals supports the original font;

in response to determining that the first terminal does not support the original font, obtaining, by the first terminal, character size data of the original font;

in response to determining that the first terminal obtains the character size data of the original font, displaying the target text in a first font supported by the first terminal; and typesetting, by the first terminal, the target text in the first font according to the character size data of the original font.

16. The storage medium according to claim 15, wherein obtaining, by the first terminal, the character size data of the original font comprises:

obtaining, by the first terminal, the character size data of the original font shared between the collaborative terminals by a second terminal in the collaborative terminals.

17. The storage medium according to claim 16, wherein obtaining, by the first terminal, the character size data of the original font comprises:

querying a local cache of the first terminal for the character size data of the original font; or     obtaining the character size data of the original font from a second terminal, wherein the second terminal is one of the collaborative terminals, and the second terminal supports the original font.

18. The storage medium according to claim 17, wherein obtaining, by the first terminal, the character size data of the original font from the second terminal comprises:

broadcasting, by the first terminal, a font query request between the collaborative terminals to determine the second terminal; and     transmitting, by the first terminal, a font assistance request to the second terminal, to obtain the character size data of the original font from the second terminal.

19. The storage medium according to claim 18, wherein broadcasting, by the first terminal, the font query request between the collaborative terminals to determine the second terminal comprises:

broadcasting the font query request between collaborative terminals, to determine a collaborative terminal supporting the original font as a candidate terminal;

in response to determining that a quantity of candidate terminals is equal to 1, determining the candidate terminal as the second terminal; and     in response to determining that a quantity of candidate terminals is greater than 1, determining a candidate terminal satisfying a preset condition as the second terminal.

20. The storage medium according to claim 15, wherein obtaining, by the first terminal, the character size data of the original font comprises:

querying the character size data of the original font in a local cache of the first terminal; and     in response to determining that the character size data of the original font cannot be queried in the local cache of the first terminal, obtaining the character size data of the original font from a second terminal, wherein the second terminal is one of the collaborative terminals, and the second terminal supports the original font.

\* \* \* \* \*